March 25, 1924.
H. C. MAISE
WINDOW HEADER FINISH STRIP
Filed Dec. 27, 1922
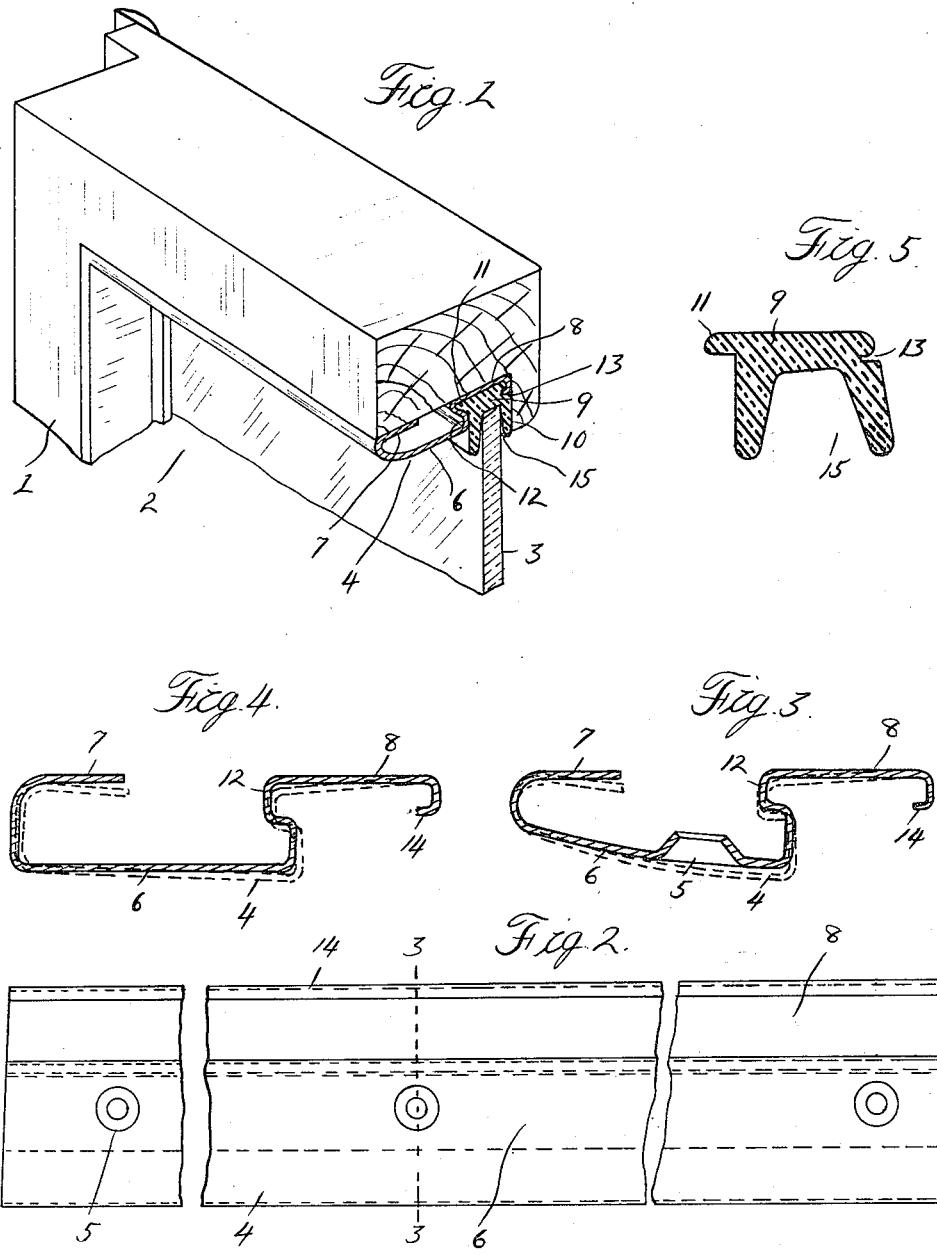
Inventor
Herman C. Maise Patented Mar. 25, 1924.

1,487,748

UNITED STATES PATENT OFFICE.

HERMAN C. MAISE, OF DETROIT, MICHIGAN, ASSIGNOR TO BRIGGS MANUFACTURING COMPANY, OF DETROIT, MICHIGAN, A CORPORATION OF MICHIGAN.

WINDOW HEADER FINISH STRIP.

Application filed December 27, 1922. Serial No. 609,204.

*To all whom it may concern:*

Be it known that I, HERMAN C. MAISE, a citizen of the United States of America, residing at Detroit, in the county of Wayne and State of Michigan, have invented certain new and useful Improvements in Window Header Finish Strips, of which the following is a specification, reference being had therein to the accompanying drawings.

The invention relates to window header finish strips and refers to those used particularly in motor vehicle bodies of the closed type. One of the objects of the invention is to provide a header finish strip with means for holding a yieldable strip which is engageable with the upper edge of a sashless glass panel. Another object is the provision of a yieldable member secured to the header finish strip and forming an anti-rattle for the glass panel as well as an efficient weather strip. With these and other objects in view, the invention resides in the novel features of construction and combinations and arrangements of parts as more fully hereinafter set forth.

In the drawings:

Figure 1 is a sectional perspective view of a portion of a motor vehicle door embodying my invention;

Figure 2 is a plan view of the header finish strip;

Figures 3 and 4 are cross-sections on the lines 3—3 and 4—4 respectively of Figure 2;

Figure 5 is a transverse section through the glass panel engaging member.

1 is the frame of the door of a closed motor vehicle body having the window opening 2 therein, and 3 the sashless glass panel, which is adapted to be raised and lowered in the door frame. 4 is the metallic header finish strip secured to the door frame at the upper edge of the window opening by suitable means such as screws passing through the series of holes 5 in the main body portion 6 of the strip. This strip has the return-bent flange 7 at its inner edge and the channel 8 at its outer edge, the base of the channel and the return-bent flange having an extended bearing upon the door frame when the strip is secured in place. However, as shown particularly in Figures 3 and 4, the contour of the main body portion changes to a substantially rectangular shape at the ends of the strip to facilitate the ease of assembling this strip with the window side finish strips.

9 is a yieldable strip, preferably formed of non-blooming rubber, anchored in the channel 8 of the finish strip and having its outer side lying adjacent to the rabbeted shoulder 10 formed upon the door frame to conceal and protect the yieldable strip. This yieldable strip is anchored in the channel by means of the lateral projection 11 at one side of the base of the strip engaging in a correspondingly shaped bead 12 in the finish strip near the base of the channel and also by a laterally extending groove 13 formed in the opposite side of the base and engaged in by the return bent flange 14 of the channel. The outer portion of the yieldable strip has the longitudinally-extending U-shaped groove 15 therein for yieldable engagement in by the upper edge of the glass panel, which latter is preferably rounded.

The header finish strip is preferably made flexible to facilitate the engagement of the yieldable strip therewith. Thus, as shown by the dotted lines in Figures 3 and 4, the middle of the strip normally tends to bulge outwardly, thereby moving the bead upon the inner side of the yieldable strip engaging channel outwardly to facilitate the engagement of the lateral projection of the yieldable strip therein. Upon the tightening of the securing screws the outward bulge is removed and the yieldable strip is firmly anchored in place.

With this arrangement, the yieldable strip may be assembled in the header finish strip before the latter is secured in the window. Also, the header finish strip and yieldable strip carried thereby present a neat and pleasing appearance and the yieldable strip constitutes an anti-rattle for the glass panel, as well as effectively forms a weather seal.

Although I have specifically shown my invention as applied to the window opening of a vehicle door, it is apparent that it may be applied to the other window openings of a vehicle body.

What I claim as my invention is:

1. The combination with a yieldable strip for engagement with the upper edge of a sashless glass panel, of a metallic header finish strip having an intermediate raised main body portion terminating at one edge in a return-bent flange and in the opposite edge in a channel for receiving said yieldable strip, said channel having portions for embracing portions of said yieldable strip to anchor the same in place.

2. The combination with a frame, of a glass panel movable therewithin, a channel-shaped member adapted to receive an edge of the glass, and a member having a channel-shaped portion holding the member aforesaid and having a laterally extending portion constituting a finish strip.

3. The combination with a yieldable strip for engagement with an edge of a sashless transparent panel, of a header finish strip having an intermediate raised main body portion terminating at one edge in a return-bent flange and in the opposite edge in a channel for receiving said yieldable strip, said channel having portions for embracing portions of said yieldable strip to anchor the same in place.

4. The combination with a frame, of a member having a channel-shaped portion secured to said frame and having a portion extending laterally from said channel-shaped portion in spaced relation to said frame, said laterally extending portion having a return-bent flange engaging said frame.

In testimony whereof I affix my signature.

HERMAN C. MAISE.